United States Patent

[11] 3,618,801

| [72] | Inventor | Donald E. Blanchard<br>Collinsville, Okla. |
|---|---|---|
| [21] | Appl. No. | 35,773 |
| [22] | Filed | May 8, 1970 |
| [45] | Patented | Nov. 9, 1971 |
| [73] | Assignee | The Dow Chemical Company<br>Midland, Mich. |

[54] COMBINATION TANK-TRAILER ASSEMBLY
6 Claims, 3 Drawing Figs.

[52] U.S. Cl.................................................. 214/501,
214/517, 298/19 B, 298/21 V
[51] Int. Cl............................................... B60p 1/04
[50] Field of Search.......................................... 214/500,
501, 2, 517; 298/20 R, 20 A, 21 V, 1 B, 19 B;
52/119

[56] References Cited
UNITED STATES PATENTS

| 2,769,661 | 11/1956 | Schonrock................... | 298/20 A |
| 3,448,866 | 6/1969 | Perry et al. .................. | 214/2 |

*Primary Examiner*—Albert J. Makay
*Attorneys*—Griswold & Burdick and Earl D. Ayers ABSTRACT: The invention concerns a tank-erecting trailer unit in which the trailer may be hauled to the location when the tank is to be erected, and then the trailer is pivoted at its hinge point by cable means to raise the tank to a vertical position. The cable means extend between the rear of the trailer and a winch located at or near the forward end of the trailer.

PATENTED NOV 9 1971 3,618,801

INVENTOR.
Donald E. Blanchard
BY Earl D. Ayers
AGENT

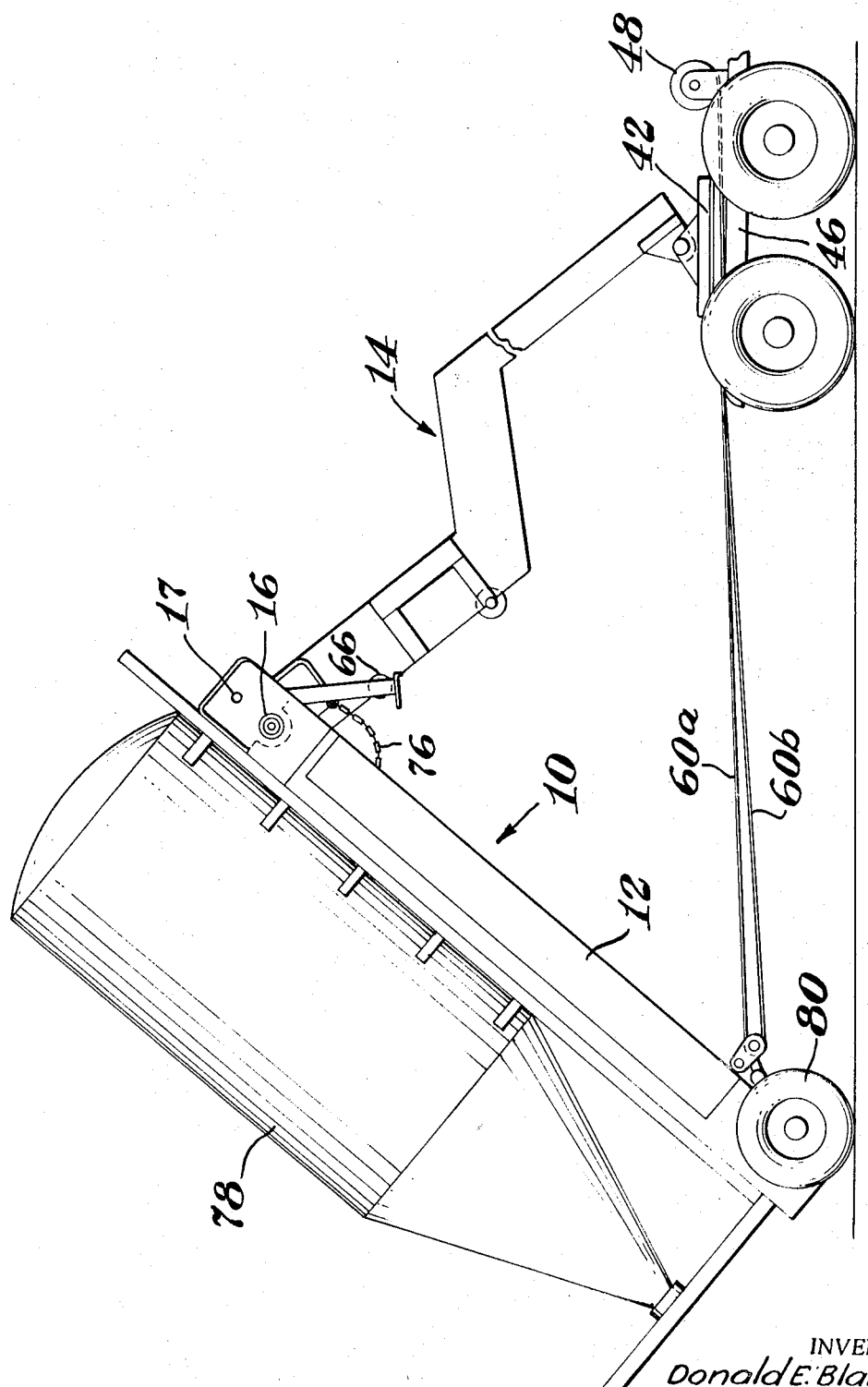

COMBINATION TANK-TRAILER ASSEMBLY

BACKGROUND OF THE INVENTION

This invention relates to tank trailers and particularly to tank-erecting trailers which are capable of being erected at the tank location by the transporting prime mover.

In many earth well-treating operations cement-carrying tanks are provided at well locations. Although some tanks may be loaded and unloaded when lying on a trailer, it is desirable in most situations that tanks, such as cement storage tanks, be set up in a vertical position.

Accordingly, a principal object of this invention is to provide an improved tank-trailer assembly.

Another object of this invention is to provide an improved, simple-to-operate, tank-erecting trailer unit.

A further object of this invention is to provide an improved, economical and easy to operate tank-erecting trailer assembly.

In accordance with this invention there is provided a semitrailer having a tank rigidly coupled thereto, the bed of the trailer being hinged near its forward end whereby the bed of the trailer may move upwardly as tension is applied between the rear of the trailer and the front of the trailer. Thus, the tank may be hauled to its location by the trailer and then the hinging action of the trailer on application of tension as mentioned above permits the tank to be easily mounted in an upright position.

The invention, as well as additional objects and advantages thereof, will best be understood when the following detailed description is read in connection with the accompanying drawings, in which:

FIG. 3 is a view of the trailer of FIG. 1, with tank coupled thereto, with the assembly jackknifed as it is raised to the tank-erecting position.

Figure 2:
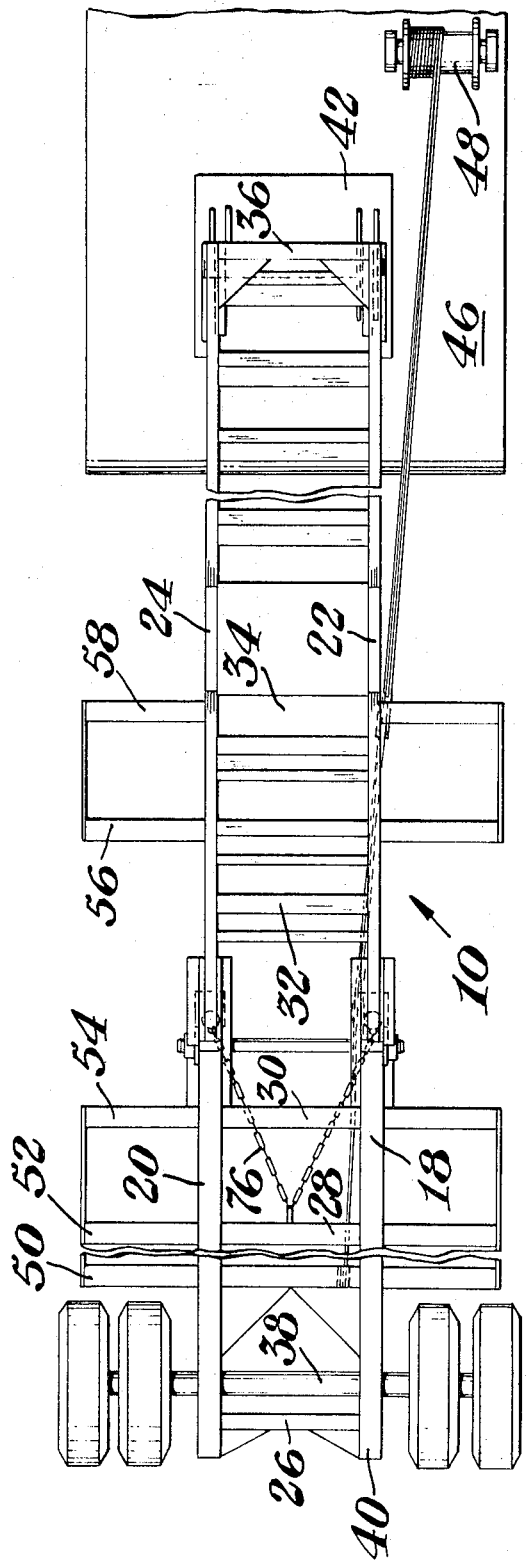
FIG. 2 is a plan view of the trailer shown in FIG. 1.
Figure 1:
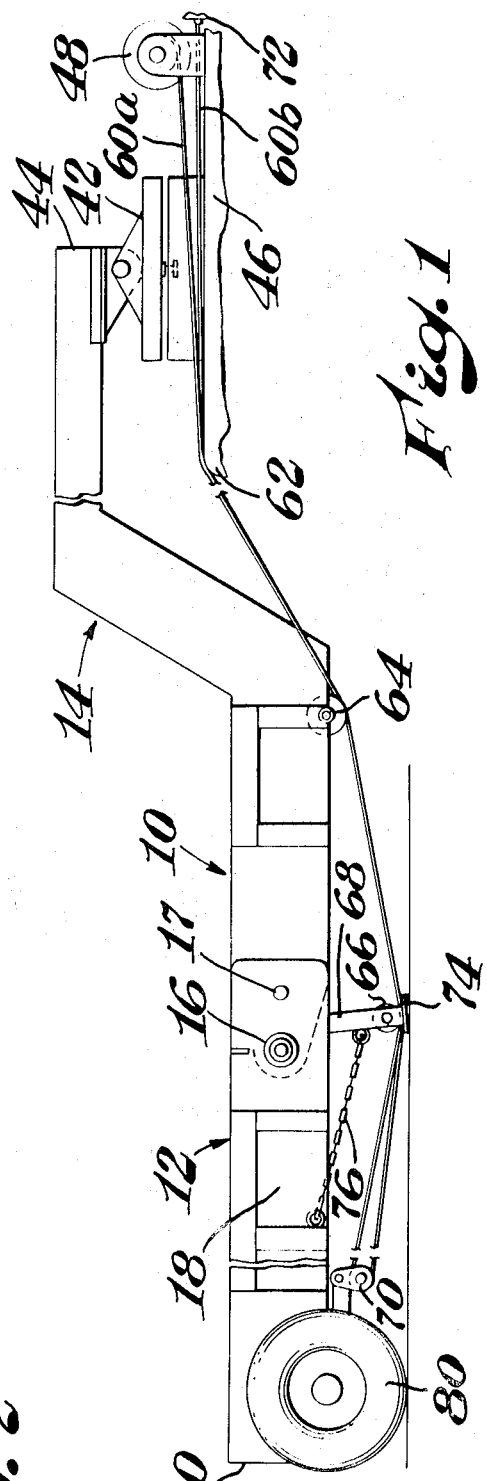
FIG. 1 is a side elevation view, partly in section, of a trailer assembly in accordance with this invention.

Referring to the drawing, there is shown a trailer assembly, indicated generally by the numeral 10, comprising an elongated frame composed of a rear section, indicated generally by the numeral 12 and a forward section, indicated generally by the numeral 14. The sections 12, 14 are pivotally joined together at the hinged joint part 16. Crossbolts 17 provide rigid coupling for on-the-road use of the assembly.

The frame sections are composed of longitudinally extending, parallel beams 18, 20 and 22, 24, each pair of beams being joined together by crossmembers 26, 28, 30 and 32, 34, 36, for example.

An axle 38 extends across and is coupled to the rear end part 40 of the trailer assembly 10. A so-called fifth wheel assembly 42 provides coupling between the front end part 44 of the trailer and the prime mover 46 which has a winch or other suitable windlass-type assembly 48 coupled thereto.

Extension side bar elements 50, 52, 54 and 56, 58, for example, are rigidly coupled, as by welding, for example, to the longitudinally extending beams 18, 20 and 22, 24.

A cable 60a, 60b extends from the winch 48 over the rear edge 62 of the prime mover 46 and, over a cylindrical element 64 disposed at the lower part of the side bar element 58, under sheave elements 66 in a leg assembly 68 which is pivotally coupled at its upper end to the rear frame section 12, over a sheave 70 near the side bar element 50 and thence back under the sheave elements 66 and back to the tiedown point 72 on the prime mover.

The leg assembly 68 has a foot element 74 at its lower end and a chain 76 coupled between the frame and the leg part of the assembly. The length of the chain 76 is such that the forward movement of the assembly is stopped with the leg at about 95° measured between the leg and the rearwardly extending longitudinal axis of the trailer assembly.

As shown in FIG. 3, an elongated tank 78 is coupled to and carried by the rear section of the trailer assembly, the output end of the tank having a base part which is generally perpendicular with respect to the bed of the rear section of the trailer assembly.

As may be seen in FIG. 2, the cable 60a, 60b is, as it passes under the sheave elements 66 which are located generally below the pivot 16, is lower than any other point along its travels from the winch 48 to the tiedown point 72.

In operation, after the trailer assembly is backed to approximately the location where the tank is to be located, the pivotal leg 68 is lowered and set in position by backing the trailer slightly. The cable 60a, 60b is then threaded from the winch 48 under elements 64, 74 and 70 and returned to the tiedown 72 on the prime mover.

The pins 17 at the pivot between the front and rear sections of the trailer assembly are pulled.

The winch 48 then winds in the cable 60a, 60b, forcing the leg 68 upwardly as the cable tightens between the elements 64, 70, thus raising the rear section of the trailer assembly and causing the vertical jackknifing of the tank-carrying trailer assembly, as shown in FIG. 3.

As more of the cable 60a, 60b is reeled in on the winch 48, the rear section of the trailer rises more and more to a vertical position. As the rear trailer section rises, the prime mover, if desired, is slowly backed towards the rear of the trailer in order to overcome any unwanted forward movement of the rear trailer section.

As may be seen in the drawings, the pivotal legs 68 serve both as support for the front end of the trailer assembly when the prime mover is removed and as a leverage point when the trailer assembly is to be jackknifed to erect the tank 78.

When the tank-rear trailer section is to be lowered to form a transport trailer assembly, forward motion of the rear wheels 80 is blocked by any suitable means (not shown) and the prime mover slowly moved forward as slack is provided in the cable 60a, 60b and the tank descends to its horizontal position.

Once the tank 78 is completely erect, it is possible to uncouple it from the trailer assembly, permitting use of the trailer assembly to move and erect other similar tanks.

What is claimed is:

1. A tank-trailer assembly for hauling tanks and then setting such tanks in operating position at a predetermined location, comprising a trailer assembly having a forward and rear section pivotally joined together in end-to-end relationship, said rear section having a wheel and axle assembly coupled thereto at the end part which is remote from said forward section, a leg assembly, having an upper and lower end, said leg assembly being pivotally mounted at said upper end to said rear section, said leg assembly having position-restraining means coupled thereto and having a cable-receiving element at its lower end, cable means coupled between the wheeled end part of said rear section and a position substantially forward of said leg assembly and passing under said cable-receiving element, said cable-receiving element being a pivot point along said cable, and reeling means for shortening said cable whereby the rear section is initially boosted by said leg and said cable and continued shortening of said cable pivotally elevates the rear section to an unloading position wherein said cable-receiving means is a sheave unit.

2. An assembly in accordance with claim 1, wherein said reeling means is a power winch.

3. An assembly in accordance with claim 1, wherein said cable-receiving means is a sheave unit.

4. An assembly in accordance with claim 1, wherein said position-restraining means is a chain coupled between the frame of said rear section and said leg assembly.

5. An assembly in accordance with claim 1, wherein said leg assembly when in operating position leans slightly towards said forward section.

6. An assembly in accordance with claim 1, wherein a tank is coupled to said rear section.

* * * * *